United States Patent [19]
Walker, Jr.

[11] Patent Number: 5,584,639
[45] Date of Patent: Dec. 17, 1996

[54] TOW TRAILER FOR TRANSPORTING PALLETS

[76] Inventor: Esler C. Walker, Jr., 705 Cross Plains Rd., Carrollton, Ga. 30117

[21] Appl. No.: 323,000
[22] Filed: Oct. 14, 1994
[51] Int. Cl.⁶ .................... B60P 1/16; B66F 9/12
[52] U.S. Cl. .................... 414/476; 414/471; 414/482; 280/64
[58] Field of Search .................... 414/476, 495, 414/24.5, 685, 460, 474, 471, 482, 483, 485, 546, 684; 280/638, 656, 789, 43, 64; 187/244; 254/3 R

[56] References Cited

U.S. PATENT DOCUMENTS

| | | | |
|---|---|---|---|
| 2,616,580 | 11/1952 | Olson | 414/685 |
| 3,185,330 | 5/1965 | Buckner | 414/476 |
| 3,876,222 | 4/1975 | Thorsell | 414/476 X |
| 3,878,959 | 4/1975 | Holdeman et al. | 414/476 X |
| 3,935,954 | 2/1976 | Woods et al. | 414/485 X |
| 4,049,143 | 9/1977 | Hatakka et al. | 214/390 |
| 4,215,963 | 8/1980 | Doner | 414/485 X |
| 4,527,935 | 7/1985 | Fortenberry | 414/24.5 |
| 4,632,626 | 12/1986 | O'Shea | 414/476 |
| 4,666,359 | 5/1987 | Parr | 414/485 |
| 4,673,328 | 6/1987 | Shiels | 414/495 X |
| 4,699,558 | 10/1987 | Hagge et al. | 414/458 |
| 4,930,971 | 6/1990 | Wilson | 414/545 |
| 4,944,648 | 7/1990 | Parr | 414/483 |
| 5,288,197 | 2/1994 | Harris | 414/495 |
| 5,362,195 | 11/1994 | Wagner | 280/789 X |

FOREIGN PATENT DOCUMENTS

| | | | |
|---|---|---|---|
| 1099017 | 3/1955 | France | 414/476 |
| 2821991 | 11/1979 | Germany | 414/24.5 |
| 1400924 | 6/1988 | U.S.S.R. | 414/476 |
| 2150507 | 7/1985 | United Kingdom | 414/485 |

Primary Examiner—Karen Merritt
Assistant Examiner—Stephen Gordon
Attorney, Agent, or Firm—Deveau, Colton & Marquis

[57] ABSTRACT

A tow trailer assembly for towing a single pallet of material behind an automobile or truck and having a substantially rigid fork frame with apparatus for connecting the trailer to the towing vehicle at one end and forks for engaging and lifting the pallet at the other end. A wheel support frame is pivotally connected to the fork frame and a hydraulic lifting cylinder is provided for moving the wheels downward relative to the fork frame to raise the fork frame into a towing position with the load substantially centered over the trailer's wheels.

8 Claims, 3 Drawing Sheets

TOW TRAILER FOR TRANSPORTING PALLETS

BACKGROUND OF THE INVENTION

1. Field of the Invention

The present invention relates generally to a device for transporting materials, and relates more specifically to a trailer to be towed behind a vehicle for transporting a pallet and the material disposed thereon.

2. Description of Related Art

A variety of materials are presently transported and stored on pallets. Typically, these pallets are of a standard construction having two flat wooden platforms with wooden spacers therebetween creating a gap of several inches, wherein the forks of a forklift may be inserted for lifting the pallet and any materials thereon. Presently, material on pallets typically is transported by loading a number of pallets onto a large flatbed truck using a forklift, driving the loaded truck to the point of destination, and unloading the palletized material by forklift at the destination. This method of transport is efficient for large numbers of pallets, but requires forklifts at both the point of origin and the delivery point, and a flatbed truck for transporting the palletized material. Because of the considerable expense involved, the transport of a single pallet of material is generally cost-prohibitive using presently existing transport methods. A variety of applications have been discovered wherein it would be desirable to transport a single pallet of material economically. For example, in the landscaping business, earthen sod is generally purchased by the pallet. Standard truck-and-forklift delivery methods are acceptable when the particular landscaping project requires a number of pallets of sod; however, many landscaping projects arise requiting only a single pallet of sod, or less.

Several devices are known to be capable of transporting a single pallet of material; however, for a variety of reasons existing prior art devices have been found to be less than entirely satisfactory. For example, U.S. Pat. No. 4,944,648 to Parr describes a trailer assembly with a load-carrying frame pivotally mounted for movement between an upright loading and unloading position, a first inclined towing position, and a second horizontal towing position. It has been found that because of the small radius of rotation in the shown mechanism, the load-carrying frame must be rotated through a fairly wide arc in order to lift the load above the ground a distance sufficient to comply with Department of Transportation ground clearance regulations (eleven (11) inches minimum). Thus, as the load-carrying frame of the '648 device is lifted from the ground, the load-carrying frame and the load move from an essentially horizontal orientation to an orientation which is so steeply inclined that many materials, such as sod, will not stay on the pallet.

Another device is shown by U.S. Pat. No. 4,666,359 to Parr which describes a towable dolly having a lifting platform pivotally connected behind its wheel assembly. It has been found that positioning the load carrying assembly behind the wheel assembly results in an unstable towing configuration wherein the weight of the load is not centered over the wheels or slightly in front of the wheels as is desired for a safe and stable towing configuration.

Thus, it can be seen that a need presently exists for a towing device capable of transporting a single pallet of material behind an automobile or light truck without the need for forklifts or a large flatbed truck. Additionally, there exists a need for a towing device capable of lifting a pallet of material a distance above the ground sufficient to comply with Department of Transportation ground clearance regulations without tilting the load so far beyond the horizontal position that the palletized material falls off of the pallet. Moreover, there exists a need for a device for towing a single pallet of material which allows the load to be centered over the wheels of the towing device or slightly forward of the wheels, such that the loaded device is stable when towed.

It is to the provision of a towing device capable of meeting these and other needs that the present invention is primarily directed.

SUMMARY OF THE INVENTION

Briefly described, in a preferred form the present invention comprises a tow trailer assembly for towing a single pallet of material behind an automobile or truck. The tow trailer assembly comprises a substantially rigid fork frame having forks at one end for supporting a load (such as a pallet) and a tongue opposite the forks for connection to the automobile or truck. The tow trailer assembly also includes a wheel support frame having at least two (2) ground-engaging wheels. The wheel support frame is pivotally mounted to the fork frame for pivotal movement between a first position allowing the forks to rest on the ground and a second position holding the forks above the ground. Means, such as a hydraulic cylinder or jack or winch, are provided for moving the wheel support frame between the first and second positions.

Preferably, the tow trailer assembly utilizes a mechanism with a radius of rotation equal to the length of the entire trailer, such that significant ground clearance may be obtained with minimal inclination of the load. The mechanism also allows the load to be positioned centrally over, or just forward of, the trailer's wheels, in a stable towing configuration.

A jack stand of known construction can be mounted to the tongue of the fork frame near the hitch to support the tongue when the trailer is not coupled with the towing vehicle. A backstop can be provided on the forks to properly position the loaded pallet on the forks, such that the load is centered over, or slightly forward of, the tow trailer's wheels.

Preferably, the wheel support frame is essentially a U-shaped structure having a pair of wheel arms extending at right angles from a horizontal cross brace. The wheel support frame preferably is oriented with its open end toward the rear of the trailer such that the wheel arms extend along the outside of the fork frame, on either side of the forks. The wheel arms of the wheel frame are pivotally connected to the fork frame by means of a pivot axle.

Preferably a hydraulic cylinder is coupled to the fork frame at one end and to the front of the wheel support frame at the other. Extending the cylinder raises the front of the wheel frame, thus causing the wheel support frame to pivot about the pivot axle and force the wheels downward relative to the fork frame. This relative motion causes the forks to be raised above the ground, lifting the loaded pallet. Because the entire fork frame is a rigid assembly from the hitch to the forks, the hitch acts as the fulcrum of rotation as the forks are lifted along an arcuate path, with the radius of rotation being equal to the entire length of the fork frame. Because of this large radius, the forks may be raised a substantial distance above the ground by rotating the fork frame through a small angle. In this manner, sufficient ground clearance is provided with minimal tilting of the load.

BRIEF DESCRIPTION OF THE DRAWING FIGURES

DETAILED DESCRIPTION OF THE PREFERRED EMBODIMENT

Figure 1:
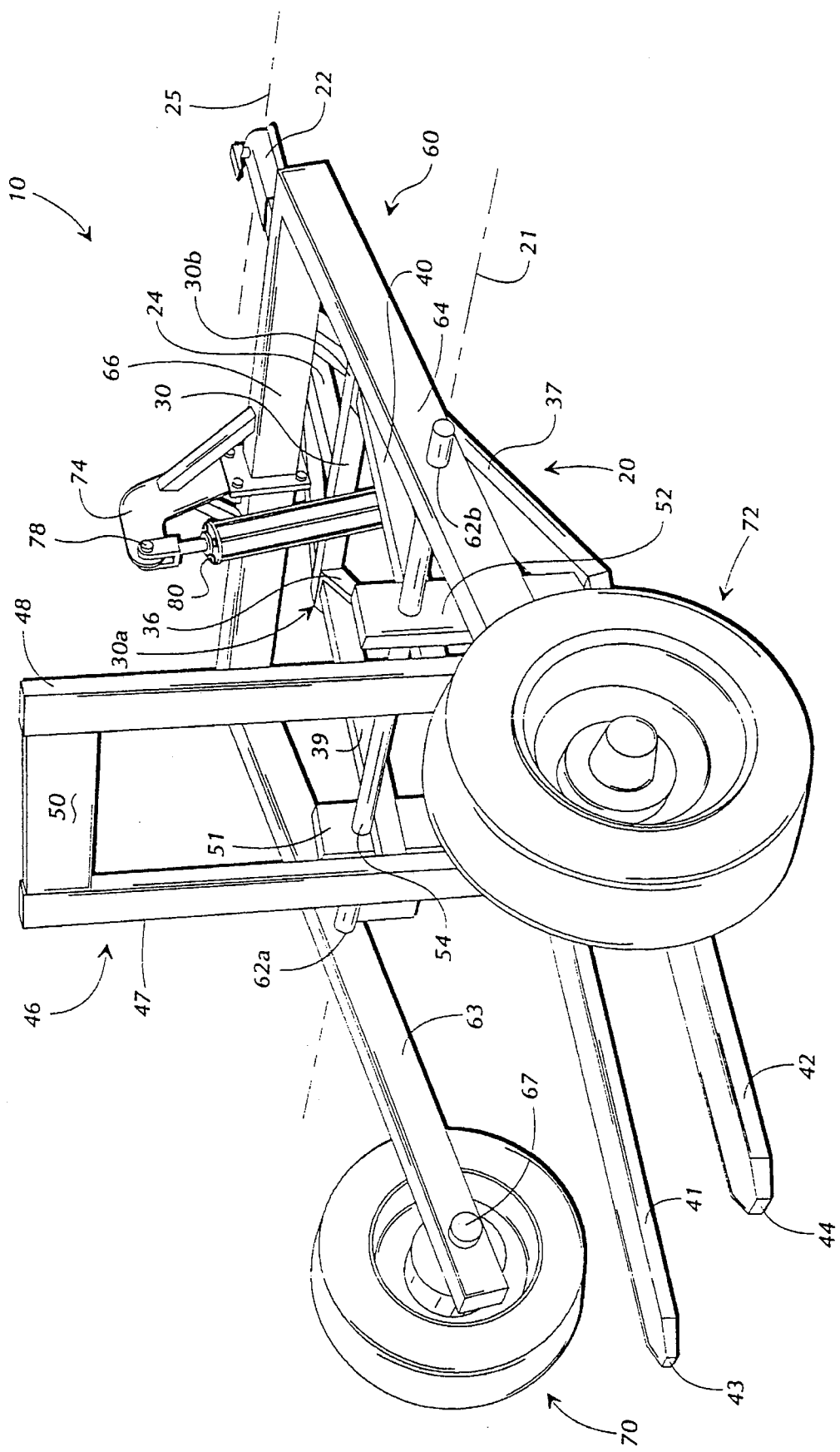
FIG. 1 is a perspective view of a tow trailer assembly according to a preferred form of the present invention shown with its forks in the lowered or loading-unloading position.

Referring now in detail to the drawing figures, wherein like reference numerals represent like parts throughout the several views, FIG. 1 depicts a tow trailer assembly 10 for transporting pallets according to a preferred form of the present invention. The tow trailer assembly 10 preferably includes a fork frame 20 pivotally connected to a wheel support frame 60, and a hydraulic cylinder 80 for pivoting wheel support frame 60 about pivot axis 21 relative to fork frame 20.

Figure 2:
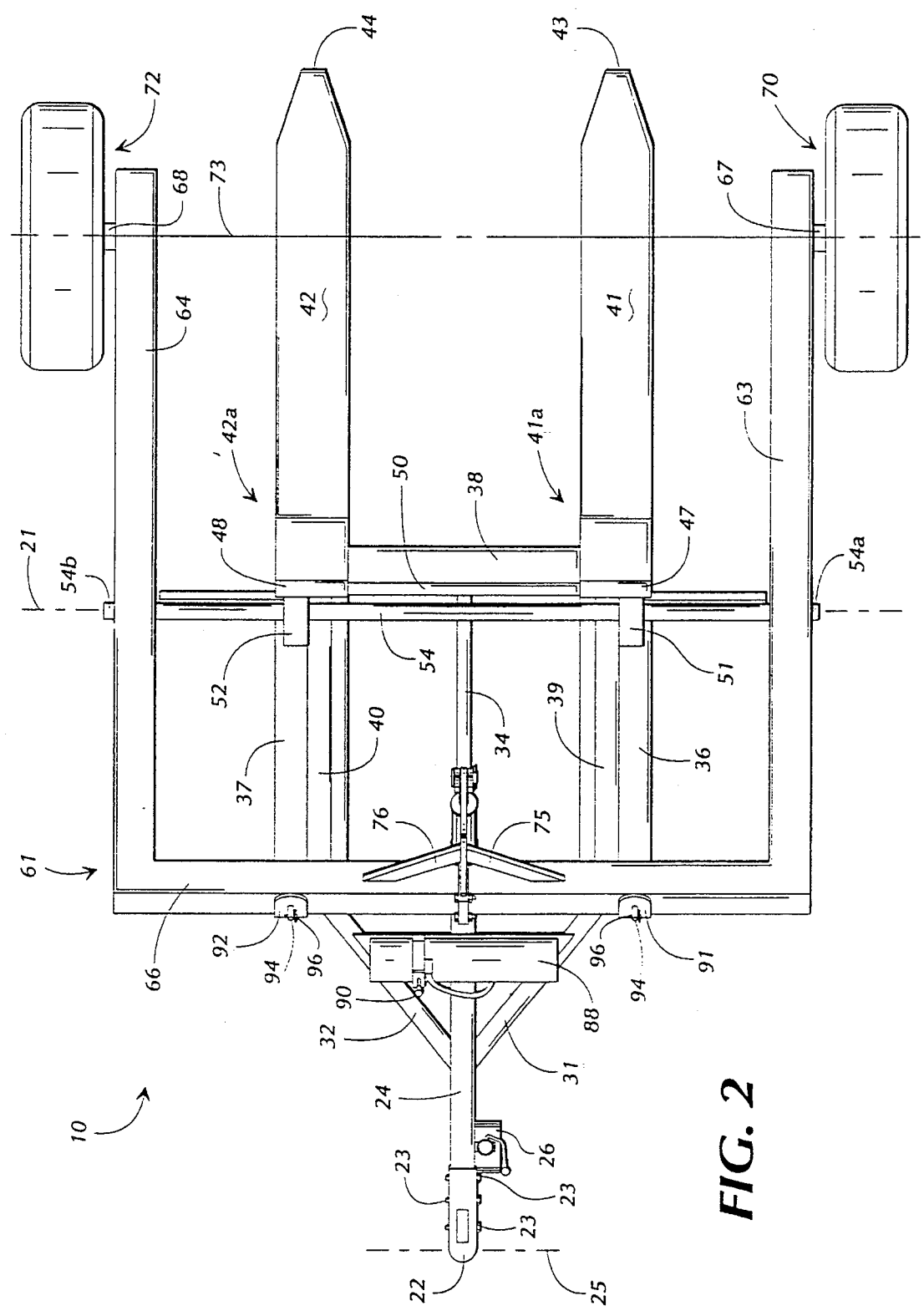
FIG. 2 is a plan view of the tow trailer assembly shown in FIG. 1.

Fork frame 20 is an elongate structure, having a conventional hitch 22 at its forward end, a pair of forks 41, 42 at its rearward end, and a plurality of structural elements therebetween. The hitch 22 is of a standard, commercially available design for engaging a ball-type towing device mounted to the automobile or truck used as a tow vehicle. As shown by FIG. 2, the hitch 22 is connected to a tongue 24 by bolts 23 or by other standard attachment means, such as welding. The tongue 24 preferably is a steel tube or channel of rectangular cross-section. The tongue 24 extends in a generally horizontal direction between hitch 22 and a tongue cross member 30. The tongue cross member 30 preferably is fabricated of square or rectangular steel tubing and is attached at its center to the tongue 24 by welding or bolting. Tongue braces 31, 32 preferably are provided between the tongue 24 and each end 30a, 30b of the tongue cross member 30 to laterally brace the tongue 24. Extending obliquely downwardly and toward the rear of fork frame 20 from each end 30a, 30b of tongue cross member 30 are diagonal fork braces 36, 37. The diagonal fork braces 36, 37 preferably are fabricated from rectangular steel tubing and are connected to the tongue cross member 30 by welding. A rectangular steel bottom bracket 38 extends horizontally between the lower ends of the diagonal fork braces 36, 37 and is preferably connected thereto by welding. Rigidly connected to the lower end of each diagonal fork brace 36, 37 is an elongate fork 41, 42. The forks 41, 42 preferably are fabricated from steel bar stock of rectangular cross section, and are connected to the diagonal fork braces 36, 37 by welding. The forks 41, 42 are of a size and shape which allow them to be inserted between the upper and lower platforms of a standard pallet. The tip 43, 44 of each fork 41, 42 is chamfered to allow the forks to more smoothly engage the pallet.

A back stop 46 is installed at the forward end of the forks 41, 42 to serve as a stop, limiting the insertion of the forks 41, 42 into the pallet and ensuring proper positioning of the pallet such that the weight of the load is properly positioned on the forks, so as to be centered over, or slightly forward of the wheels of tow trailer assembly 10. Backstop 46 can be fabricated with a pair of vertical uprights 47, 48 extending vertically upward from the forward end 41a, 42a of each fork 41, 42, such that the uprights 47, 48 prevent the palletized load from shying forward during transit. A cross tie 50 is provided between the tops of the uprights 47, 48 to lend additional structural support to the backstop 46. A pair of backstop braces 39, 40 are secured between the upper forward end of each diagonal fork brace 36, 37 and the corresponding upright 47, 48 to brace the backstop 46 and provide additional structural support for the fork frame 20.

Figure 3A:
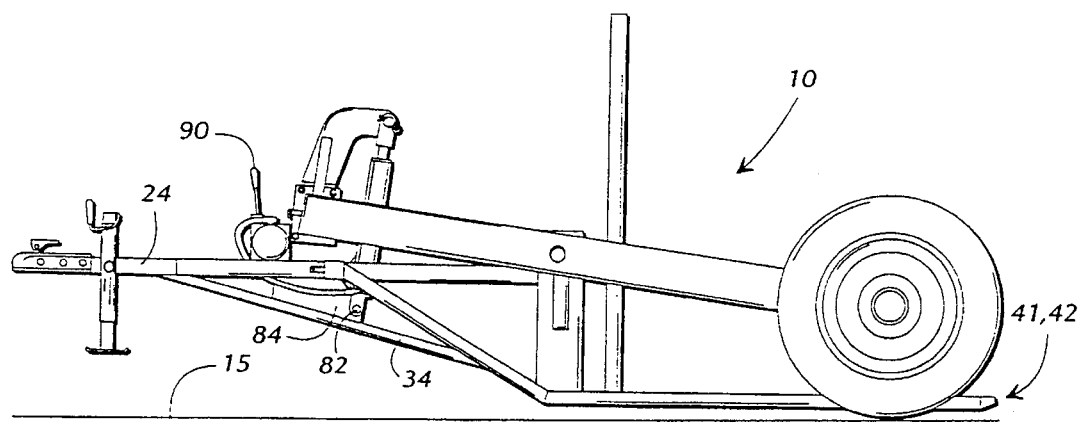
FIGS. 3a–3c are schematic side elevation views of the trailer of FIG. 1 depicting the device's range of motion through a fully raised position (FIG. 3a), a partly raised position (FIG. 3b), and a lowered position (FIG. 3c).

As shown by FIG. 3a, tow trailer assembly 10 is configured such that when it is in its lowered loading or unloading position, with the tongue 24 oriented generally horizontally, the forks 41, 42 are parallel to and raised just slightly above the ground 15. Pivot axle supports 51, 52 extend vertically upward from the intersection of each fork 41, 42 and its diagonal fork brace 36, 37. The pivot axle supports 51, 52 can be welded or bolted at their upper ends to the backstop braces 39, 40. A pivot axle 54 extends horizontally across the fork frame 20 through the upper end of each pivot axle support 51, 52, with the ends 54a, 54b of the pivot axle 54 extending horizontally outwardly from the fork frame 20.

As shown by FIG. 1, tow trailer assembly 10 also includes a wheel support frame 60 which is pivotally connected to the fork frame 20 by the pivot axle 54. The wheel frame 60 is essentially a U-shaped yoke 61 including a pair of wheel arms 63, 64 extending rearward at right angles from a horizontal wheel frame cross brace 66. Each wheel arm 63, 64 has a wheel and tire assembly 70, 72. The wheel frame cross brace 66 and the wheel arms 63, 64 preferably are fabricated from rectangular or square steel tubing of sufficient structural strength to support the loaded tow trailer assembly 10 during transit. The wheel frame cross brace 66 is disposed horizontally above, and essentially parallel to, the tongue cross member 30 of fork frame 20. The U-shaped yoke 61 is oriented with its open end toward the rear of the tow trailer assembly 10, such that the wheel arms 63, 64 extend rearwardly, along the outside of the fork frame 20 on either side of the forks 41, 42. A wheel axle 67, 68 at the end of each wheel arm 63, 64 distal from wheel frame cross brace 66 supports a wheel and a tire, each of typical, commercially available design. The wheel arms 63, 64 are arranged outside of the forks 41, 42 and are set apart a distance sufficient to allow clearance for a loaded pallet on the forks. A pivot bearing 62a, 62b is provided on each wheel arm 63, 64 at the approximate mid-point of the wheel arm's length. The pivot bearings engage the pivot axle 54 of the fork frame 20 such that the wheel support frame 60 is pivotally connected to the fork frame 20 in a scissors-like fashion.

In its preferred form, tow trailer assembly 10 also includes a hydraulic cylinder 80 mounted between a lifting bracket 74 centrally oriented on wheel frame cross brace 66, and the lower tongue member 34 of fork frame 20. Although a hydraulic cylinder is preferred, it will be clear to those skilled in the art that a hand-operated hydraulic jack, a screw jack, a ratchet jack, a winch or other lifting means could be employed. The upper end of the hydraulic cylinder 80 is connected to lifting bracket 74 which is mounted centrally on the upper surface of wheel frame cross brace 66. Lifting bracket braces 75, 76 are provided on each side of the lifting bracket 74 to lend structural support. Hydraulic cylinder 80 is coupled to the lifting bracket 74 by means of an upper cylinder pin 78 which allows hydraulic cylinder 80 to pivot about lifting bracket 74, so that cylinder 80 experiences no bending moment as the cylinder raises the forward end of wheel support frame 60. The lower end of hydraulic cylinder 80 is connected to fork frame 20 by a lower cylinder pin (82) which is mounted to a cylinder support fin (84) on lower tongue member 34. Hydraulic cylinder 80 is of a standard commercially available design, selected to have a lifting capacity sufficient to raise the forks of loaded tow trailer assembly 10, and a stroke of sufficient length to provide adequate ground clearance for tow trailer 10. A hydraulic pump 88 with an actuator 90 supplies pressurized fluid to the hydraulic cylinder 80. Hydraulic pump 88 and actuator 90 can be mounted on the tongue 24 of fork frame 20, or in any other conveniently accessible location. Pump 88 is supplied with power from an unshown battery mounted on fork frame 20, or alternatively, may be connected to a DC power outlet supplied on the tow vehicle (truck or automobile).

Lugs 94 are positioned on the forward facing surfaces of the wheel frame cross brace 66 and the tongue cross member 30 so that transport position locking straps 91, 92 can be installed to lock the tow trailer in its upright or towing position. In the preferred embodiment, lugs are provided on each side of the lifting bracket 74. The transport position locking straps 91, 92 preferably are rigid steel bars, slightly joggled, and having a hole in each end to receive the lugs 94. The transport position locking straps 91, 92 are of a length such that these holes engage the lugs 94 when the hydraulic cylinder 80 is in its fully extended position, such that the tow trailer 10 remains in the raised or transport position without the assistance of hydraulic cylinder 80. Lugs 94 are preferably provided with holes for receiving lock pins 96 to prevent the transport position locking straps 91, 92 from disengaging the lugs 94 once installed.

In operation, the tow trailer 10 is coupled with an unshown towing vehicle by raising the hitch 22 with jack 26, positioning the tow vehicle's tow ball beneath hitch 22, and lowering hitch 22 with the jack 26 in order to engage the ball within hitch 22. Jack 26 is then rotated into its fully retracted position. If the transport position locking straps 91, 92 have been installed, they are removed, and the hydraulic cylinder 80 is lowered to its fully retracted position. The forks 41, 42 are now positioned essentially horizontally and raised slightly above the ground 15. Tow trailer assembly 10 is towed to a position immediately in front of the pallet to be transported, and then moved backward such that the forks 41, 42 penetrate the pallet. The trailer is moved backward until the forward end of the pallet contacts the backstop 46 indicating that the pallet is properly positioned over, or slightly in from of, the central wheel axis 73. In order to provide a stable towing configuration, the load should be positioned on the forks 41, 42 such that its center of gravity is not behind central wheel axis 73. Such a loading configuration could cause the rear of fork frame 20 to pivot downwardly about central wheel axis 73, resulting in an upward force on hitch 22, and potentially uncoupling the tow trailer assembly 10 from the tow vehicle. By configuring the backstop 46, the forks 41,42, and the wheel support frame 60 as described above, the present invention properly positions the load's center of gravity in a stable towing configuration between central wheel axis 73 and hitch 22.

Figure 3B:
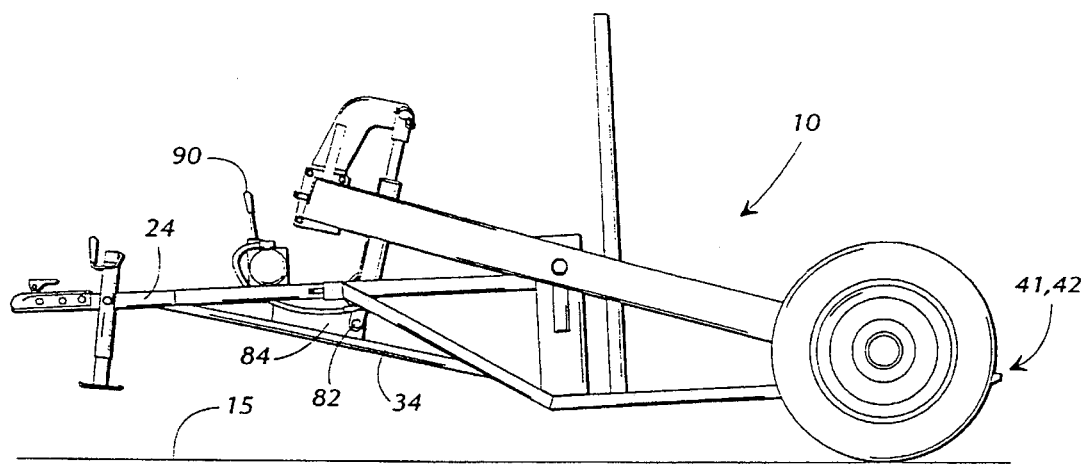
Figure 3C:
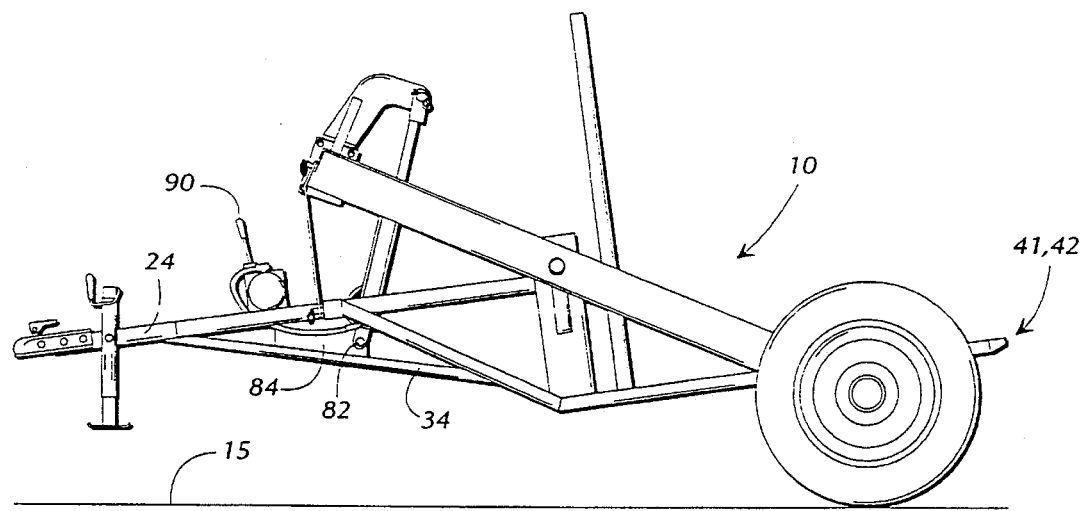

Once the pallet has been properly engaged, the tow trailer is moved to its raised or transport position as shown by FIGS. 3a–3c. The operator activates the pump 88 using the hydraulic actuator 90, thus causing hydraulic cylinder 80 to extend and move the wheel frame cross brace 66 upward relative to the tongue cross member 30 of fork frame 20. As the wheel frame cross brace 66 is raised, wheel arms 63, 64 pivot about pivot axle 54 in a scissors-like fashion, to move the forks 41, 42 upwardly relative to the wheels 70, 72. Because the downward motion of the wheels 70, 72 is constrained by the ground 15, this relative motion causes the fork frame 20 to pivot upward about hitch axis 25, thus raising the forks 41, 42 a distance above the ground.

Because the entire length of the fork frame 20 pivots about the hitch axis 25, a small angle of inclination of the fork frame 20 raises the forks 41, 42 a substantial distance. For example, a prototype embodying a preferred form of the present invention has been constructed, and is capable of raising the forks approximately twelve inches (12") above the ground by inclining the fork frame less than 10° while supporting a load in excess of 2500 pounds. This allows sufficient ground clearance to meet ground clearance requirements without inclining the palletized load so steeply as to cause the load to shift or fall from the pallet. Once the tow trailer 10 is in its fully raised position (FIG. 3c), the transport position locking straps 91, 92 are installed on the lugs 94 on the wheel frame cross brace 66 and the tongue cross member 30. Lock pins 96 are inserted into the holes in the lugs 94. The pump 88 and hydraulic cylinder 80 may then be deactivated. The trailer is then towed to the desired point of destination where the above sequence of operations is reversed to unload the pallet from the trailer if desired.

While the invention has been disclosed in its preferred form, it will be apparent to those skilled in the art that many modifications, additions, and deletions can be made therein without departing from the spirit and scope of the invention as set forth in the following claims.

What is claimed is:

1. A tow trailer assembly for use with an automobile or truck, comprising:

a. a substantially rigid fork frame having forks at one end for supporting a load and a tongue opposite said forks for connection to the automobile or truck;

b. a wheel support frame comprising a pair of wheel arms having ground-engaging wheels at first ends thereof and a cross brace connecting second ends thereof and being pivotally mounted to said fork frame midway along the length of said wheel arms, for relative movement between a first position allowing said forks to rest adjacent the ground and a second position holding said forks spaced above the ground; and c. means for moving said wheel support frame between said first and second positions, wherein said substantially rigid fork frame pivots about said connection between said tongue and the automobile or truck, between a loading configuration corresponding to said first position of said wheel support frame, and a transport configuration corresponding to said second position of said wheel support frame.

2. A tow trailer assembly as claimed in claim 1 wherein said wheel support frame is generally U-shaped.

3. A tow trailer assembly as claimed in claim 1 wherein said ground-engaging wheels are mounted to said wheel support frame at a position spaced from an end of said forks closest to said tongue, whereby a load supported by the forks may be centered over or forward of the ground-engaging wheels.

4. A tow trailer assembly as claimed in claim 1 further comprising a backstop means for preventing the load from shifting on said forks, and for positioning the load on said forks centrally over, or forward of said ground engaging wheels.

5. A tow trailer assembly as claimed in claim 1 wherein said means for moving said wheel support frame between said first and second positions comprises a hydraulic cylinder.

6. A tow trailer assembly as claimed in claim 1 wherein with said wheel support frame in said first position said forks are substantially parallel to the ground, and with said wheel support frame in said second position said forks are spaced at least one (1) foot above the ground while being inclined no more than 20° to the ground.

7. A tow trailer assembly as claimed in claim 6 wherein with said wheel support frame in said second position said forks are inclined no more than 15 degrees to the ground.

8. A tow trailer assembly as claimed in claim 6 wherein with said wheel support frame in said second position said forks are inclined no more than 10 degrees to the ground.

\* \* \* \* \*

(12) EX PARTE REEXAMINATION CERTIFICATE (7841st)
United States Patent
Walker, Jr.

(10) Number: US 5,584,639 C1
(45) Certificate Issued: Nov. 2, 2010

(54) TOW TRAILER FOR TRANSPORTING PATTETS

(75) Inventor: Esler C. Walker, Jr., Carrollton, GA (US)

(73) Assignee: John H. Simmons, Columbus, GA (US)

Reexamination Request:
No. 90/009,547, Sep. 15, 2009

Reexamination Certificate for:
Patent No.: 5,584,639
Issued: Dec. 17, 1996
Appl. No.: 08/323,000
Filed: Oct. 14, 1994

(51) Int. Cl.
*B60P 1/16* (2006.01)
*B66F 9/12* (2006.01)

(52) U.S. Cl. .................. 414/476; 414/471; 414/482; 280/64

(58) Field of Classification Search .................. 414/476, 414/481, 482; 280/64
See application file for complete search history.

(56) References Cited

U.S. PATENT DOCUMENTS

| 3,941,264 A | 3/1976 | da Silva Bento |
| 4,392,687 A | 7/1983 | O'Connell |

FOREIGN PATENT DOCUMENTS

| NZ | 215238 | 6/1987 |
| WO | WO/91/01081 A1 | 2/1991 |

*Primary Examiner*—Matthew C. Graham

(57) ABSTRACT

A tow trailer assembly for towing a single pallet of material behind an automobile or truck and having a substantially rigid fork frame with apparatus for connecting the trailer to the towing vehicle at one end and forks for engaging and lifting the pallet at the other end. A wheel support frame is pivotally connected to the fork frame and a hydraulic lifting cylinder is provided for moving the wheels downward relative to the fork frame to raise the fork frame into a towing position with the load substantially centered over the trailer's wheels.

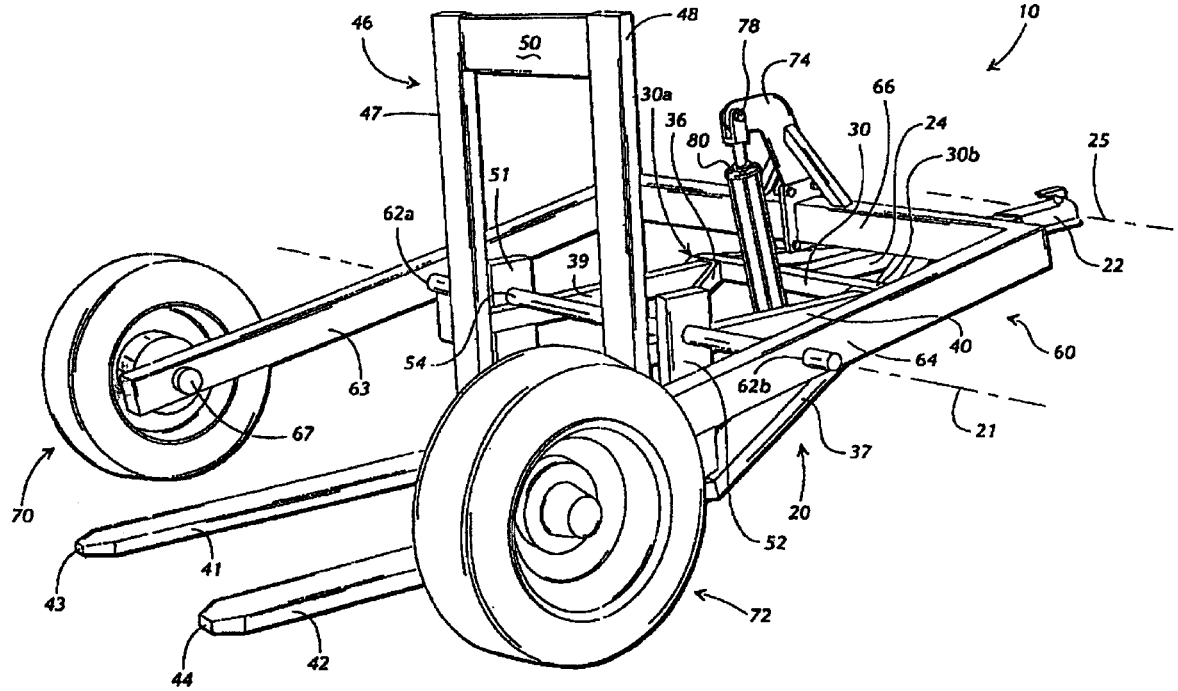

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-8 are cancelled.

* * * * *